(12) United States Patent
Kita et al.

(10) Patent No.: US 7,448,805 B2
(45) Date of Patent: Nov. 11, 2008

(54) THRUST DYNAMIC PRESSURE BEARING, SPINDLE MOTOR USING THEREOF, AND INFORMATION RECORDING/REPRODUCING DEVICE USING THE SPINDLE MOTOR

(75) Inventors: Hiromi Kita, Nara (JP); Shigeo Obata, Hyogo (JP); Kenichi Miyamori, Hyogo (JP); Hiromitsu Noda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 330 days.

(21) Appl. No.: 10/587,567

(22) PCT Filed: Oct. 31, 2005

(86) PCT No.: PCT/JP2005/019971

§ 371 (c)(1),
(2), (4) Date: Jul. 31, 2006

(87) PCT Pub. No.: WO2006/049114

PCT Pub. Date: May 11, 2006

(65) Prior Publication Data

US 2007/0189648 A1    Aug. 16, 2007

(30) Foreign Application Priority Data

Nov. 2, 2004    (JP)    ............... 2004-318959

(51) Int. Cl.
*F16C 32/06*    (2006.01)

(52) U.S. Cl. ..................... 384/123; 384/112

(58) Field of Classification Search ................. 384/107, 384/112, 121, 123
See application file for complete search history.

(56) References Cited

U.S. PATENT DOCUMENTS

| | | | | |
|---|---|---|---|---|
| 5,795,074 A | * | 8/1998 | Rahman et al. | 384/123 |
| 2002/0122610 A1 | * | 9/2002 | Shiraishi | 384/123 |

FOREIGN PATENT DOCUMENTS

| | | |
|---|---|---|
| JP | 4-105216 | 9/1992 |
| JP | 10-73127 A | 3/1998 |
| JP | 2001-173645 A | 6/2001 |
| JP | 2003-113837 A | 4/2003 |
| JP | 2003-120660 A | 4/2003 |

* cited by examiner

*Primary Examiner*—Thomas R Hannon
(74) *Attorney, Agent, or Firm*—McDermott Will & Emery LLP

(57) ABSTRACT

A thrust dynamic pressure bearing with high inclination-resistant rigidity against axis runout and additionally low bearing loss torque is implemented. Herringbone grooves (131) having intermediate bends (132) are provided on rotating-side bearing surface (11) provided on the rotating-side bearing member. When rotating-side bearing surface (11) rotates in direction A (clockwise), lubricating oil generates dynamic pressure in an area centering on intermediate bend (132) along radially outer part (133) and radially inner part (134) of herringbone groove (131). As a result that groove width (G) of a dynamic pressure generating groove and width (L) of a land adjacent to the dynamic pressure generating groove holds G>L at an arbitrary radius (2) position, a thrust dynamic pressure bearing with high inclination-resistant rigidity and additionally low bearing loss torque is provided.

9 Claims, 17 Drawing Sheets

Ratio of groove width G to land width L (G:L)

Ratio of groove width G to land width L (G:L)

THRUST DYNAMIC PRESSURE BEARING, SPINDLE MOTOR USING THEREOF, AND INFORMATION RECORDING/REPRODUCING DEVICE USING THE SPINDLE MOTOR

RELATED APPLICATIONS

This application is the U.S. National Phase under 35 U.S.C. §371 of International Application No. PCT/JP2005/019971, filed on Oct. 31, 2005, which in turn claims the benefit of Japanese Application No. 2004-318959, filed on Nov. 2, 2004, the disclosures of which Applications are incorporated by reference herein.

TECHNICAL FIELD

The present invention relates to a thrust dynamic pressure bearing that supports an axiswise load in a rotating machine smoothly rotating at high speed, particularly to a thrust dynamic pressure bearing with high inclination-resistant rigidity against pivotal runout and low bearing loss torque, to a spindle motor using the thrust dynamic pressure bearing, and to an information recording/reproducing device using the spindle motor.

BACKGROUND ART

In a spindle motor for rotating a recording medium in an information recording/reproducing device such as a hard disk drive, various kinds of thrust dynamic pressure bearings are proposed that generate dynamic pressure by means of spiral grooves or herringbone grooves with intermediate bends, as a means for suppressing axial runout as well as for supporting an axiswise load, of the rotor. (Refer to Japanese Patent Unexamined Publication No. 2001-173645 (Paragraph 6, FIG. 3), No. 2003-113837 (Paragraph 7, FIG. 1), and No. H10-73127 (Paragraph 12, FIG. 8), for example.)

FIG. 12A illustrates the makeup in principle of a conventional thrust dynamic pressure bearing. The bearing is composed of bearing surface 11 of rotating-side member (rotor) 10, and bearing surface 21 of fixed-side member 20, where both surfaces mutually face in the direction of rotation center axis 1, having a minute interspace filled with lubricating oil 50 therebetween. The outer circumference of the minute interspace is provided thereon with a sealing section forming air-liquid boundary surface 51 for lubricating oil 50 and air. At least one of bearing surface 11 of rotating-side bearing member 10 and bearing surface 21 of fixed-side bearing member 20 is provided thereon with dynamic pressure generating grooves 30. Further, land 40 is formed adjacent to dynamic pressure generating groove 30.

FIG. 12B illustrates another makeup in principle of a conventional thrust dynamic pressure bearing. In the same way as shown in FIG. 12A, the bearing is composed of bearing surface 11 of rotating-side member (rotor) 10, and bearing surface 21 of fixed-side member 20, where both surfaces mutually face in the direction of rotation center axis 1, having a minute interspace filled with lubricating oil 50 therebetween. The outer circumference of the minute interspace is provided thereon with a sealing section forming air-liquid boundary surface 51 for lubricating oil 50 and air.

As the shape of dynamic pressure generating groove 30, spiral groove 35 shown in FIG. 13 and herringbone groove 31 shown in FIG. 14 are known. Dynamic pressure generating grooves 31, 35, which are recesses; and lands 41, 45, which are projections with the roughly same shape as the dynamic pressure generating grooves, are formed alternately at a given pitch. Groove width G and land width L hold G=L (in patent literature 1), or G<L (in patent literatures 2, 3), where groove width G and land width L are length or angle of an arc formed with circle 2 with an arbitrary radius assumed to be drawn on the bearing surface, and dynamic pressure generating grooves 31, 35 and lands 41, 45, all intersecting.

The cross sections of the dynamic pressure generating grooves along circle 2 with an arbitrary radius are shown in FIGS. 15A, 15B. When using a method such as etching, coining, electrolytic processing, or electric discharging, to form dynamic pressure generating grooves, lands 41, 45 generally have a trapezoidal shape, and corners C of lands 41, 45 and the grooves are often made rounded, as shown in FIG. 15A. Land width L in such a case means a region where the cross-sectional profile of a land is higher than the elevation control line, which is half of groove depth H; and width G, lower than this elevation control line. Meanwhile, when forming dynamic pressure generating grooves with an NC lathe and further smoothing the top of a land formed in FIG. 15A with a flat-surface grinding machine or the like, the corner at the top of the land could be sharp as shown in FIG. 15B. Land width L in such a case is to be the width of the flat part at the top of the land.

Typical thrust dynamic pressure generating grooves formed by electrolytic processing or electric discharging are illustrated in drawings of patent literature 3 and others. Their representative example is shown in FIG. 16A. The upper and lower part of fixed-side bearing member 320 fixed to fixed axis 300 (shown in FIG. 16B later) are provided thereon with herringbone grooves 331, which are recesses. Herringbone groove 331, if formed by electrolytic processing or the like, has roughly the same circumferential length from the inner circumference through the outer circumference. Land 341 adjacent to herringbone groove 331 is formed as an unprocessed part by electrolytic processing. The most inner and outer circumferences of fixed-side bearing member 320 compose ring-shaped recesses 350, 351 by electrolytic processing, cutting, or the like, in the same way as in herringbone groove 331, so that lubricating oil smoothly moves inside the thrust bearing. The sectional view of the substantial part of the bearing using this fixed-side bearing member 320 for a thrust bearing is shown in FIGS. 16B, 16C. FIGS. 16B, 16C show states of the motor stopped and steadily rotating, respectively. In a state of the motor stopped, the top surface of fixed-side bearing member 320 contacts rotating-side thrust plate 310. Meanwhile, in a state of the motor steadily rotating, a dynamic pressure occurs between member 320 and plate 310, causing them to be floated and spaced by a given height. Here, when shifting from a stopped state to a rotating state, or vise versa, lubricating oil moves back and forth vertically across the thrust bearing through herringbone groove 331 and ring-shaped recesses 350, 351, as shown by direction 353 (outline arrow).

Meanwhile, with the popularization of personal digital assistances of recent years, downsizing, slimming down, and low power consumption are demanded in information recording/reproducing devices such as a hard disk drive to be mounted on a personal digital assistance. Consequently, slimming down, implementing of highly accurate rotation free of axis runout, and low power consumption are essential to a spindle motor for rotating a recording medium of an information recording/reproducing device.

In a spindle motor used for a conventional, relatively large hard disk drive such as 3.5-inch or 2.5-inch types, its rotation axis can be made long. Therefore, as a result that two-tiered, radial dynamic pressure bearings are arranged around the rotation axis, and the axis is supported at two points, upper and lower, rigidity (referred to as "inclination-resistant rigidity" hereinafter) has been secured against disturbance moment torque, which tends to generate axis runout by fluctuating pivotal inclination. Meanwhile, in a spindle motor for a small, slim hard disk drive of 1.8-inch type or smaller, the rotation axis must be made short for slimming down. Therefore, it is difficult to arrange two-tiered, radial dynamic pressure bearings around the rotation axis. Consequently, it is difficult to secure inclination-resistant rigidity for suppressing pivotal runout by a radial dynamic pressure bearing.

Even if two-tiered arrangement is achieved, inclination-resistant rigidity in radial bearings is proportional to the approximate square of the pitch between the two radial bearings. This causes inclination-resistant rigidity to become significantly low in a slim motor applied particularly for a hard disk drive with a thickness of 5 mm or less.

Under the circumstances, increasing inclination-resistant rigidity of the thrust dynamic pressure bearing is required to suppress pivotal runout by a thrust dynamic pressure bearing instead of a radial one. Meanwhile, bearing loss torque of the dynamic pressure bearing needs to be decreased to reduce power consumption. In other words, a thrust dynamic pressure bearing for a slim spindle motor with low power consumption and high rotation accuracy requests higher inclination-resistant rigidity and lower bearing loss torque than a conventional thrust dynamic pressure bearing.

Methods for processing thrust dynamic pressure grooves include etching, coining, and electrolytic processing. When forming thrust dynamic pressure grooves with such a method and incorporating them into a motor, eccentricity from the rotation center and variation in groove width assuredly result. Here, if the design goal is set so that the ratio of groove width G to land width L will be 1:1, the ratio randomly fluctuates even on the same radius due to eccentricity and/or variation in processing, resulting in G>L or G<L depending on the location of a dynamic pressure groove. This leads to the degree of concentration (pump-in/pump-out characteristic) changing according to a rotation phase when generating pressure by concentrating lubricating oil on a given position owing to land effect caused by the dynamic pressure grooves. In a state of G:L=50:50, the rotation axis tends to incline due to the weakest inclination-resistant rigidity as described later, thus inducing fluctuation in fluid level and/or vibration of the surface, of lubricating oil near the thrust bearing. Lubricating oil will increases and/or decreases between the facing surfaces of the thrust bearing, in a transitional condition such as one where the floating level of the thrust bearing changes from zero to a given value, particularly when starting the motor; or when the rotation speed rapidly fluctuates during operation in the motor for an optical disc drive. At this moment, when ratio G:L is approximately 50:50 and additionally randomly disperses depending on location or rotation phase of a thrust dynamic pressure groove, the rotation axis tends to incline due to its low inclination-resistant rigidity, preventing lubricating oil from being normally supplied and discharged depending on phase. If the fluid surface vibrates and/or supplying and discharging of lubricating oil malfunction, lubricating oil will not fill the space between the thrust bearings, and consequently air will be involved in the bearing, and/or lubricating oil will leak from the bearing. An experiment proves that such phenomena prominently occur if the randomly fluctuating component ΔG of groove width G exceeds approximately 3% of (G+L). In this way, the bearing involving air therein causes problems, namely generating rotation fluctuation component, decreasing the bearing rigidity, and additionally shortening the bearing life if lubricating oil leaks from the bearing.

SUMMARY OF THE INVENTION

The present invention aims to solve the above-mentioned problems. The invention adopts a simple makeup with a minimum of changes on the conventional one for a thrust dynamic pressure bearing that generates dynamic pressure by means of herringbone or spiral grooves formed on the bearing surface. More specifically, the invention aims to provide a thrust dynamic pressure bearing with higher inclination-resistant rigidity and lower bearing loss torque than a conventional one, and to suppress involving air in the bearing and leakage of lubricating oil even if groove width G randomly fluctuates.

The present invention further aims to provide a slim spindle motor using this thrust dynamic pressure bearing, with low power consumption and high rotation accuracy, and a slim information recording/reproducing device using this spindle motor, with low power consumption and high reliability.

Information recording/reproducing devices according to the present invention include a recording medium such as in a HDD, VCR, or optical disc drive. Devices according to the present invention further include a device loaded with a recording/reproducing element on a high speed rotating motor; a laser beam printer, scanner, and copy machine, loaded with a polygon mirror on a spindle motor for recording and reproducing information by reflecting laser beams to movably illuminate a given position. In other words, devices according to the present invention include a device using a high-speed rotating motor among those for recording or reproducing information, but not limited to this type of devices.

In order to solve the above-mentioned, conventional problems, a thrust dynamic pressure bearing according to the present invention is equipped with bearing surfaces of the rotating-side bearing member and of the fixed-side bearing member, both surfaces mutually facing axiswise, having a minute interspace therebetween. The minute interspace is filled with lubricating oil, and multiple dynamic pressure generating grooves are formed on one of the bearing surfaces of the rotating-side bearing member and of the fixed-side bearing member. The thrust dynamic pressure bearing retains its rotation as a result that dynamic pressure of lubricating oil is induced by dynamic pressure generating grooves according to rotation of the rotating-side bearing member. Groove width G of a dynamic pressure generating groove and width L of a land adjacent to the dynamic pressure generating groove are to hold G>L.

In another thrust bearing according to the present invention, width G and width L hold G>L in an area of more than 80% of the region where dynamic pressure generating grooves are formed, provided on the bearing surfaces of the rotating-side bearing member and of the fixed-side bearing member, both surfaces mutually facing, having a minute interspace therebetween.

Still another thrust dynamic pressure bearing according to the present invention has herringbone-shaped dynamic pressure generating grooves.

Yet another dynamic pressure bearing according to the present invention has spiral-shaped dynamic pressure generating grooves.

Further another thrust dynamic pressure bearing according to the present invention has herringbone-shaped dynamic pressure generating grooves, and the ratio of groove width G of a dynamic pressure generating groove to width L of a land adjacent to the dynamic pressure generating groove ranges from G:L=65:35 to G:L=75:25.

Still further another thrust dynamic pressure bearing according to the present invention has spiral-shaped dynamic pressure generating grooves, and the ratio of groove width G to width L ranges from G:L=65:35 to G:L=80:20.

The above-mentioned makeup allows a thrust dynamic pressure bearing according to the present invention to have higher inclination-resistant rigidity and lower bearing loss torque than a conventional thrust dynamic pressure bearing. Further, positively making groove width G longer than land width L suppresses the influence of a processing error on pump-in/pump-out characteristic. This results in suppressing fluctuation in fluid level of lubricating oil and/or involvement of air. Experimentally, such occurrence is suppressed even if randomly fluctuating component ΔG of groove width G reaches approximately 6% of (G+L).

A spindle motor according to the present invention is equipped with a thrust dynamic pressure bearing described in any one of the above.

An information recording/reproducing device according to the present invention is loaded with a spindle motor equipped with a thrust dynamic pressure bearing described in any one of the above.

REFERENCE MARKS IN THE DRAWINGS

Figure 1:
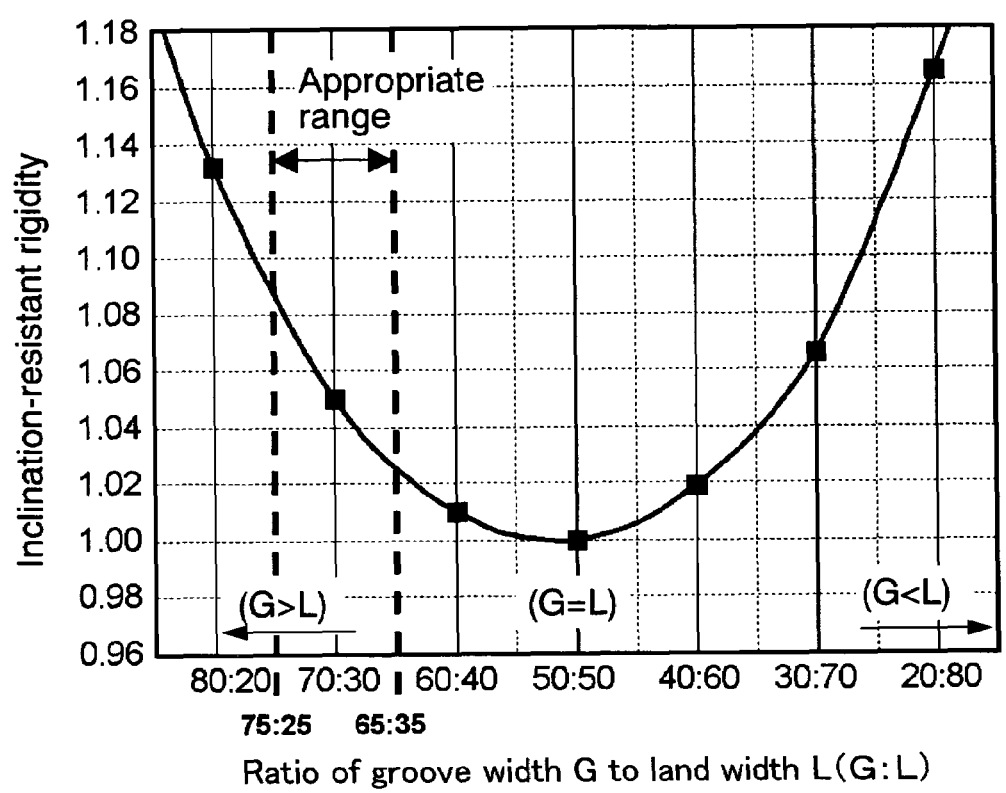
FIG. 1 is a characteristic diagram illustrating the relationship between ratio G:L of groove width G to land width L, and inclination-resistant rigidity, in a case of a constant thrust load in a thrust dynamic pressure bearing with herringbone grooves.

1 Rotation center axis
2 Circle with arbitrary radius
10 Rotating-side bearing member
11 Rotating-side bearing surface
20 Fixed-side bearing member
21 Fixed-side bearing surface
30 Dynamic pressure generating groove
31 Herringbone groove
32 Intermediate bend
35 Spiral groove
36 Most inner circumference
40 Land adjacent to dynamic pressure generating groove
41 Land adjacent to herringbone groove
45 Land adjacent to spiral groove
50 Lubricating oil
51 Air-liquid boundary surface
131 Herringbone groove
132 Intermediate bend
133 Radially outer part
134 Radially inner part
135 Spiral groove
136 Most inner circumference
141 Land adjacent to herringbone groove
145 Land adjacent to spiral groove
201 Rotation center
202, 302 Rotor 202a Hollow cylinder
202b Flange
202c Outer circumferential surface
202d Bottom end surface
202e Rotating-side bearing
202f Step
203 Rotating magnet
204 Rotor
205 Chassis
206 Fixed-side bearing member
206a Inner circumferential surface
206b Top end surface
206c Fixed-side bearing
207 Coil
208 Stator core
209 Stator
210 Fixed axis
210a Stepped surface
210b Internal screw
211 Shielding plate
212, 312 Spindle motor
214, 314 Disk
215 Screw
216 Disk holding member
217 Cover
217a Touching part
218 Cover fixing screw
220 Dynamic pressure bearing
220a Thrust dynamic pressure bearing
220b Radial dynamic pressure bearing
221 Herringbone groove of radial dynamic pressure bearing

DETAILED DESCRIPTION OF PREFERRED EMBODIMENTS

Figure 2:
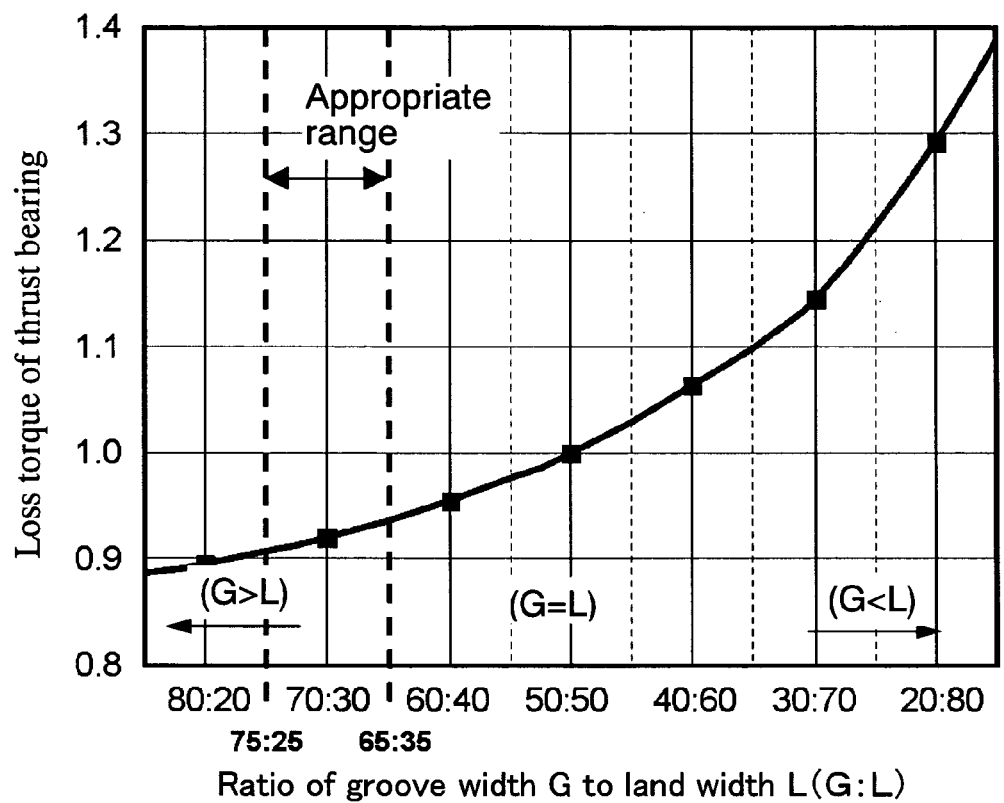
FIG. 2 is a characteristic diagram illustrating the relationship between ratio G:L of groove width G to land width L, and bearing loss torque, in a case of a constant thrust load in a thrust dynamic pressure bearing with herringbone grooves.
Figure 3:
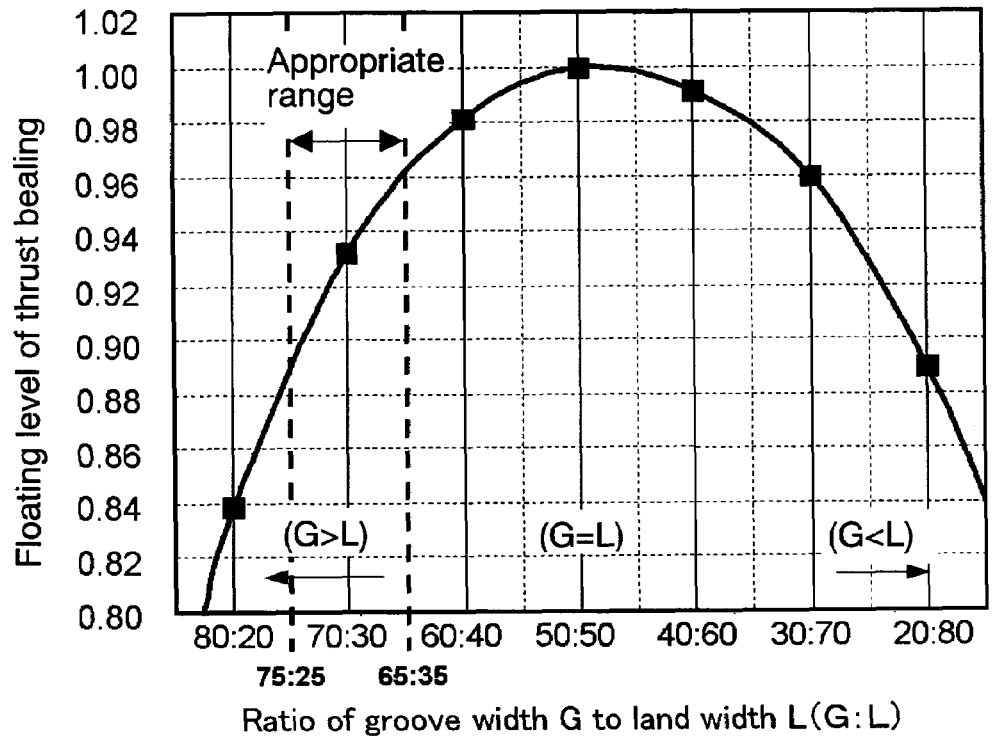
FIG. 3 is a characteristic diagram illustrating the relationship between ratio G:L of groove width G to land width L, and floating level of the thrust bearing, in a case of a constant thrust load in a thrust dynamic pressure bearing with herringbone grooves.
Figure 4:
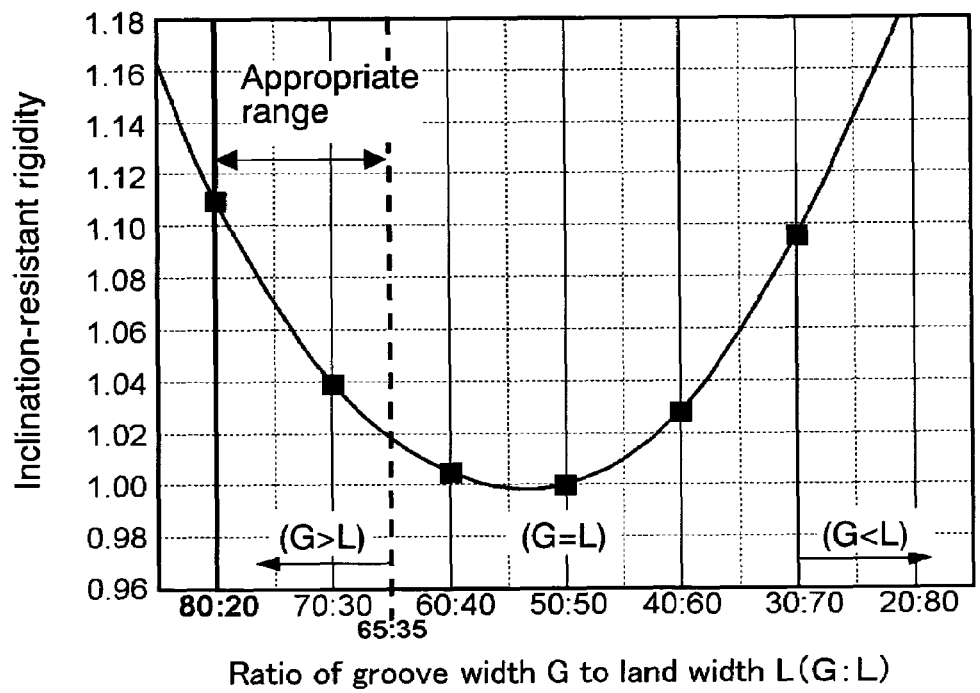
FIG. 4 is a characteristic diagram illustrating the relationship between the ratio G:L of groove width G to land width L, and inclination-resistant rigidity, in a case of a constant thrust load in a thrust dynamic pressure bearing with spiral grooves.
Figure 5:
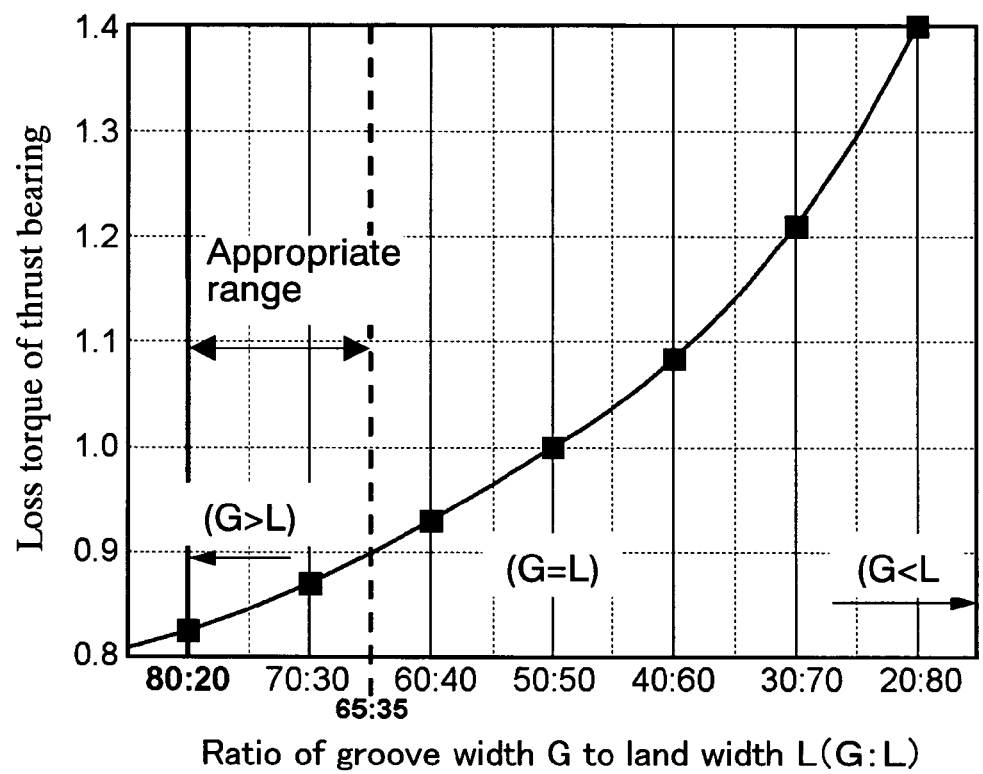
FIG. 5 is a characteristic diagram illustrating the relationship between the ratio G:L of groove width G to land width L, and loss torque, in a case of a constant thrust load in a thrust dynamic pressure bearing with spiral grooves.
Figure 6:
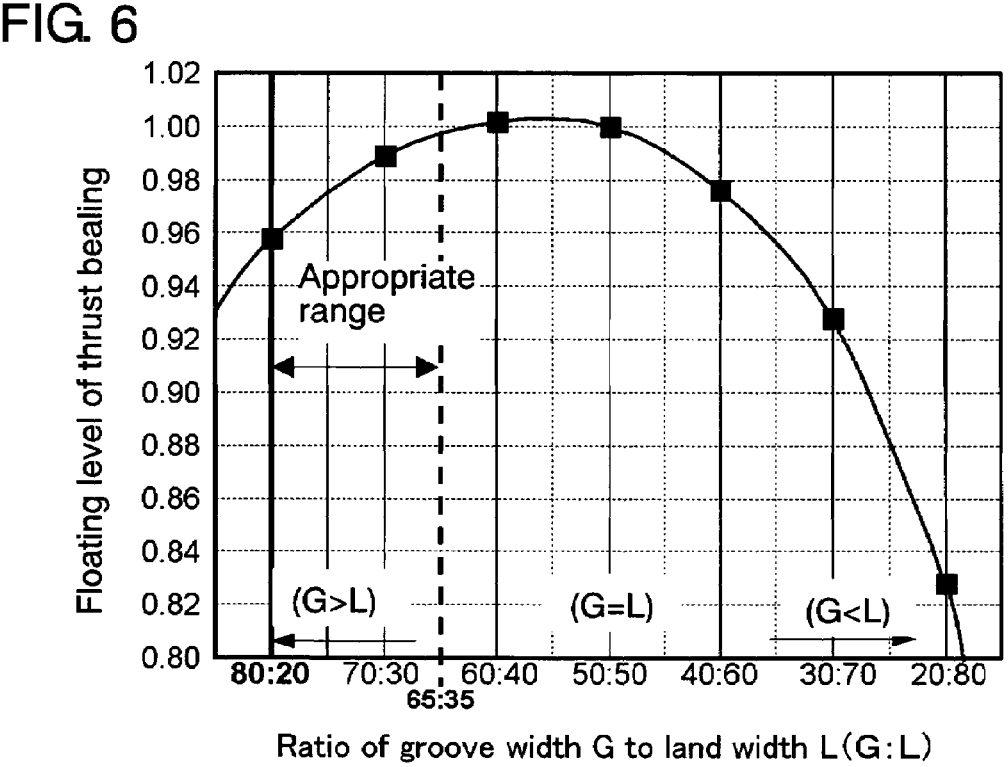
FIG. 6 is a characteristic diagram illustrating the relationship between the ratio G:L of groove width G to land width L, and floating level of the thrust bearing, in a case of a constant thrust load in a thrust dynamic pressure bearing with spiral grooves.

FIGS. 1, 2, 3 respectively show results of the numeric analysis using finite element method on a thrust dynamic pressure bearing with herringbone grooves. The figures show ratio G:L of groove width G to land width L, inclination-resistant rigidity of the thrust dynamic pressure bearing, and the relationship between bearing loss torque and floating level of the thrust bearing, in a case of a constant thrust load. Here, the vertical axis indicates ratios assuming that each value is 1.0 when G:L=50:50. Meanwhile, FIGS. 4, 5, 6 show results of the numeric analysis using finite element method on a thrust dynamic pressure bearing with spiral grooves. In the same way as in herringbone grooves, the figures respectively show inclination-resistant rigidity, relationship between bearing loss torque and floating level of the thrust bearing. For both herringbone grooves used in FIG. 1 through 3 and spiral grooves in FIG. 4 through 6, the number of grooves is 10, the most external diameter is 5.5 mm, the most internal diameter is 3.6 mm, and the groove depth is 10 μm. The calculation result on the basis of finite element method proves that the characteristics shown in FIGS. 1 through 6 remain the same with different viscosity of lubricating oil as long as the shape of grooves is the same. For a different basic shape of the grooves above-mentioned, the tendency of the characteristics does not largely change although the characteristics themselves slightly change.

From FIG. 1, inclination-resistant rigidity of the thrust dynamic pressure bearing with herringbone grooves is minimized when G:L=50:50. FIG. 1 proves that inclination-resistant rigidity increases with greater differences between groove width G and land width L. In a case of the same floating level of the thrust bearing, and groove width G smaller than land width L, makes the flow path narrow and decreases the flow rate of lubricating oil flowing through the grooves. Accordingly, dynamic pressure generated decreases, and so does the bearing load capacity. Inversely, groove width G greater than land width L makes the flow path wide and increases the flow rate of lubricating oil. However, dynamic pressure generated decreases due to inadequately compressed lubricating oil, and so does the bearing load capacity. Consequently, floating level of the thrust bearing with herringbone grooves is maximized when G:L=50:50 in a case of a constant thrust load, as shown in FIG. 3. Meanwhile, inclination-resistant rigidity and axiswise bearing rigidity of a thrust bearing are inversely proportional to floating level roughly. Therefore, inclination-resistant rigidity is minimized at G:L for the maximum floating level.

Here, FIG. 4 shows that inclination-resistant rigidity changes as G:L changes in a case of spiral grooves as well. Inclination-resistant rigidity reaches its maximum value when G:L is approximately 52:48, which means that groove width G is slightly greater than land width L as compared with the case of herringbone grooves. The fact that G:L at which the maximum value is reached is different depending on a groove shape in this way is assumed to result from the fact that a location at which the maximum pressure occurs is different between herringbone and spiral grooves. A herringbone groove has a turn-around point near the central part of halfway radially. The maximum pressure occurs near this turn-around point. Meanwhile, for a spiral groove, the maximum pressure is generated at the radially most inner circumference. In this way, generated pressure is distributed differently, and thus ratio G:L at which inclination-resistant rigidity reaches the maximum value results in a slight difference depending on a groove shape. FIGS. 2 and 5 indicate that the bearing loss torque of the thrust dynamic pressure bearing decreases with greater groove width G. This is because great groove width G widens the flow path to allow lubricating oil to flow easily, which decreases the average shear velocity over the entire bearing surface due to the viscosity of lubricating oil to reduce the frictional resistance.

From FIGS. 3, 6, in order to bear a thrust load, a lower floating level of the thrust bearing is required to increase the dynamic pressure so as to balance with the thrust load in a case of G>>L or G<<L than G~L. As aforementioned, floating level of the thrust bearing with herringbone grooves is maximized when G=L; with spiral grooves, G:L=53:47. In both cases, floating level of the thrust bearing decreases with greater difference between groove width G and land width L.

In other words, in a case of the same floating level of the thrust bearing, groove width G smaller than land width L makes the flow path narrow and decreases the flow rate of lubricating oil flowing through the grooves. Accordingly, dynamic pressure generated decreases, and so does the bearing load capacity. Inversely, groove width G greater than land width L makes the flow path wide and increases the flow rate of lubricating oil. However, dynamic pressure generated decreases due to inadequately compressed lubricating oil, and so does the bearing load capacity.

Consequently, in order to bear a thrust load, a lower floating level of the thrust bearing is required to increase the dynamic pressure so as to balance with the thrust load in a case of G>>L or G<<L than G≈L.

Here, as aforementioned, change in floating level of the thrust bearing largely influence the inclination-resistant rigidity of the bearing. In a case of the same floating level of the thrust bearing, the axial rigidity and inclination-resistant rigidity, of the thrust bearing increase with smaller bearing clearance in principle. Therefore, inclination-resistant rigidity becomes higher in a case of G>>L or G<<L than G≈L because floating level of the thrust bearing is low.

All of the above prove that the greater groove width G than land width L, the better in order to make inclination-resistant rigidity higher than the conventional thrust dynamic pressure bearing and additionally in order to decrease bearing loss torque. However, excessively increasing groove width G causes overly lowered floating level of the thrust bearing, combined with lowered viscosity of lubricating oil particularly at high temperatures. This brings concern that the bearing surface of the rotating-side bearing member contacts that of the fixed-side bearing member. While the bearing surface of the rotating-side bearing member slidingly contacts that of the fixed-side bearing member after starting and before floating, land width L excessively decreases to increase the bearing stress. This may cause sliding wear to proceed. That is to say, groove width G could be greater than land width L not excessively, in order to increase inclination-resistant rigidity and additionally to decrease bearing loss torque.

Here, assumption is made that a decrease in floating level of the thrust bearing owing to an increase in groove width G is allowed by up to approximately 10%, and an increase in anti-inclination rigidity and a decrease in bearing loss torque are expected to be at least 2%. From FIGS. 1, 2, 3, for herringbone-shaped dynamic pressure grooves, an appropriate range of groove width G and land width L is desirably from G:L=65:35 to G:L=75:25.

For spiral-shaped dynamic pressure grooves, an appropriate range of groove width G and land width L is desirably from G:L=65:35 to G:L=80:20, more desirably from G:L=65:35 to G:L=75:25, from FIGS. 4, 5, 6, taking into consideration variation in processing accuracy of land width L at the inner circumference of the spiral grooves.

Here, the above-mentioned advantages are achieved if G>L is satisfied in 70%, desirably 80%, more desirably 90%, or more of the region where dynamic pressure generating grooves are formed that are provided on the bearing surface and generate dynamic pressure in cooperation with lubricating oil.

However, "bearing surface" here refers to a region where the interspace between the rotating-side bearing member and the fixed-side one is less than 5 μm in a state of the motor stopped and the floating level of zero. A region where the interspace is greater than that is excluded. The "interspace" refers to an axiswise interspace between a land circumferentially adjacent to a dynamic pressure generating groove (recess) and the other bearing member facing the land.

Here, a region where dynamic pressure generating grooves are formed does not refer to the entire region where the interspace is less than 5 μm in a state of the motor stopped mentioned above, but refers to the region only where dynamic pressure generating grooves are actually formed out of such a region. Therefore, an extended part in such a region is not taken into consideration. Regarding the groove shape, G:L is not necessarily required to be constant in the entire region, but could vary (provided G>L) with regularity in the rotation phase direction. Further, G:L may vary (provided G>L) according to the radial position. In such makeup with herringbone grooves, the range is desirably G:L=65:35 to G:L=75:25. With spiral grooves, the range is G:L=65:35 to G:L=80:20, more desirably G:L=65:35 to G:L=75:25.

Further, as a result that inclination-resistant rigidity improves, fluctuation in fluid level of lubricating oil and involvement of air are suppressed because prohibitive power against fluctuation in inclination of the rotation axis even if groove width G randomly fluctuates. Therefore, even if the accuracy of the dynamic pressure generating grooves is lowered, the reliability can be maintained.

A spindle motor according to the present invention is equipped with the above-mentioned thrust dynamic pressure bearing. This makeup allows implementing a slim spindle motor with low power consumption, high rotation accuracy with small pivotal runout, high reliability, and low cost.

An information recording/reproducing device according to the present invention is loaded with the above-mentioned spindle motor. This makeup allows implementing an information recording/reproducing device with low power consumption and high reliability to facilitate downsizing and slimming down of equipment using the device.

With a thrust dynamic pressure bearing according to the present invention, inclination-resistant rigidity against pivotal runout increases as a result of groove width G of the dynamic pressure generating grooves being larger than width L of the land adjacent to the dynamic pressure generating grooves. This brings superior advantages such as highly accurate rotation and low bearing loss torque.

In a spindle motor for a slim (particularly type 1 or smaller, which is a drive with a thickness of 5 mm or less) hard disk drive, which is difficult to ensure inclination-resistant rigidity against pivotal runout only with a radial dynamic pressure bearing due to its short rotation axis, using such a thrust dynamic pressure bearing is effective. This makeup allows implementing a slim spindle motor with high rotation accuracy owing to its high inclination-resistant rigidity without relying on a radial dynamic pressure bearing. In addition, the low bearing loss torque enables implementing low power consumption. Moreover, even if the accuracy of the dynamic pressure generating grooves is lowered, the reliability can be maintained, thus implementing cost reduction.

Loading with this spindle motor brings superior advantages of being able to implement low power consumption, downsizing, and slimming down of an information recording/reproducing device at low cost, particularly for a small, slim hard disc drive of type 1 or smaller. The information recording/reproducing device using a hard disk drive of type 1 or smaller, often taken along by its user, makes less involvement of air into the bearing and leakage of lubricating oil from the bearing than a hard disk drive adopting the conventional bearing structure, which brings great advantage of being able to achieve high reliability.

Further, loading with this spindle motor brings superior advantages of being able to achieve low power consumption and high reliability for an information recording/reproducing device being operated almost all day long in an office, such as a laser beam printer.

Hereinafter, a description is made for exemplary embodiments of the present invention with reference to FIGS. 7 through 11. Here, for an element with the same makeup as in FIGS. 12 through 16, showing the conventional example, the same mark is given for description.

FIRST EXEMPLARY EMBODIMENT

Figure 7A:
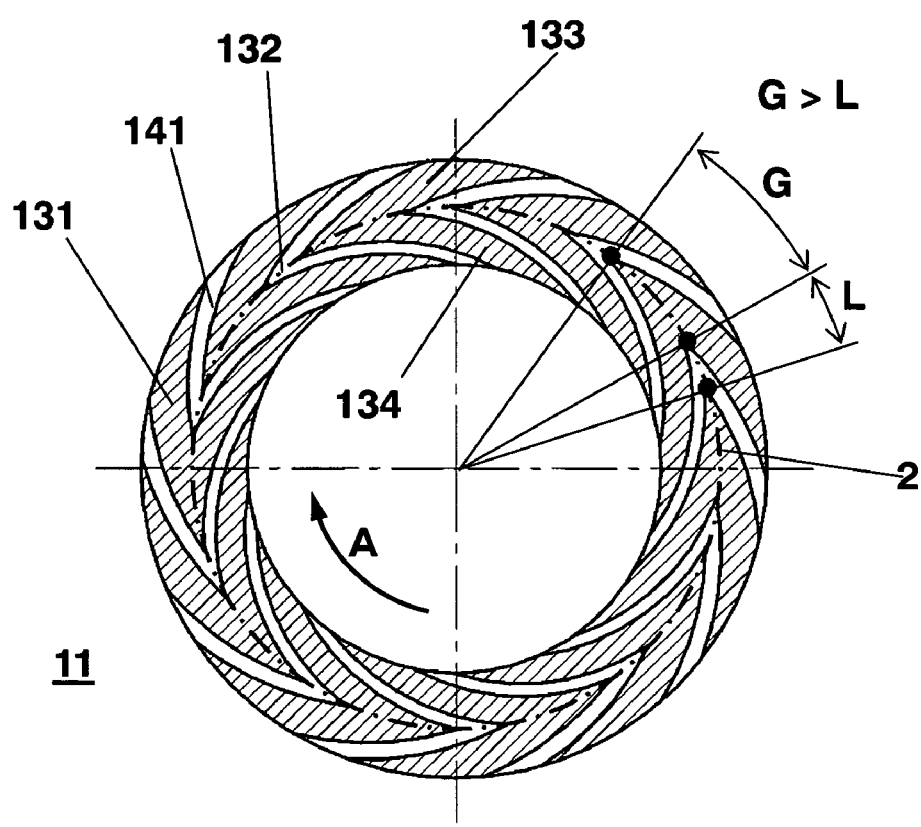
FIG. 7A is a pattern diagram of herringbone grooves on the bearing surface of a thrust dynamic pressure bearing according to the first exemplary embodiment of the present invention.

FIG. 7A illustrates a thrust dynamic pressure bearing according to the first exemplary embodiment of the present invention.

The first embodiment is different from the conventional example in that groove width G of herringbone groove 131 having intermediate bend 132 formed on bearing surface 11, and width L of a land adjacent to the dynamic pressure generating groove satisfy G>L. The other fundamental makeup is the same as in FIGS. 12 through 16, showing the conventional example.

In other words, the bearing is composed of bearing surface 11 of rotating-side member (rotor) 10, and bearing surface 21 of fixed-side member 20, where both surfaces mutually face in the direction of rotation center axis 1, having a minute interspace filled with lubricating oil 50 therebetween. The outer circumference of the minute interspace is provided thereon with a sealing section forming air-liquid boundary surface 51 for lubricating oil 50 and air. As shown in FIG. 7A, multiple herringbone grooves 131 having intermediate bends 132 for generating dynamic pressure, and lands 141 with the same shape as the dynamic pressure generating grooves are formed on bearing surface 11 of rotating-side bearing member 10, alternately at a given pitch, and additionally so that groove width G and land width L satisfy G>L. At this moment, the allowable range of ratio G:L of groove width G to land width L could be G>L at an arbitrary position in radial direction 2.

Here, ratio G:L of groove width G of herringbone groove 131 to width L of a land adjacent to herringbone groove 131 is to range from G:L=65:35 to G:L=75:25. Even if ratio G:L changes radially, it is to range from G:L=65:35 to G:L=75:25. In the thrust dynamic pressure bearing thus composed, when bearing surface 11 rotates in direction A, lubricating oil flows along radially outer part 133 and radially inner part 134 toward intermediate bend 132, of herringbone groove 131. Accordingly, dynamic pressure occurs in a region centering on intermediate bend 132. This dynamic pressure lifts bearing rotating member 10 axiswise against the thrust load, to retain the rotation out of touch. From the reason described using FIGS. 1 through 3 before, inclination-resistant rigidity higher and loss torque lower than a conventional thrust dynamic pressure bearing are achieved.

In the above description, herringbone groove 131 is formed on bearing surface 11 of rotating-side bearing member 10, and bearing surface 21 of fixed-side bearing member 20 is to be a smooth surface. However, the present invention is not limited to this makeup, but herringbone groove 131 may be formed on bearing surface 21 of fixed-side bearing member 20, and bearing surface 11 of rotating-side bearing member 10 may be a smooth surface.

Further, ratio G:L does not need to be fixed to one value on the bearing surface, but different kinds of combination may be arranged regularly. Such an example may be the following. That is, two kinds of groove widths G and G', and two kinds of land width L and L' satisfy G>L, G>L', G'>L, and G'>L', and ratios G:L and G':L' of groove width to land width range from 65:35 to 75:25. Then, these respective two kinds of grooves and lands may be alternately arranged.

The present invention does not need to hold G>L over the entire region of the dynamic pressure generating grooves. The present invention could hold G>L in an area of 80%, more desirably 90%, or more of the area where the dynamic pressure generating grooves are formed. For example, in any one of the rotating-side bearing member and the fixed-side bearing member, when warpage occurs under the influence of processing accuracy or the like, only the inner circumference contacts when stopped, and an interspace is generated at the outer circumference, the thrust bearing increases its number of rotations while contact sliding at its inner circumference at startup, to lift eventually At this moment, small land width L of the inner circumference may cause wear and/or burn due to high bearing stress during metal contact. Therefore, land width L at the inner circumference could be increased to suppress bearing stress of the metal contact part at startup. For this purpose, G and L may be G:L=75:25 from the outer circumference to the central part radially, and G<<L near the inner circumference.

Inversely, G and L may be G:L=65:35 from the inner circumference to the central part radially, and G<<L at the most inner circumference, to achieve the purpose of the present invention.

Figure 7B:
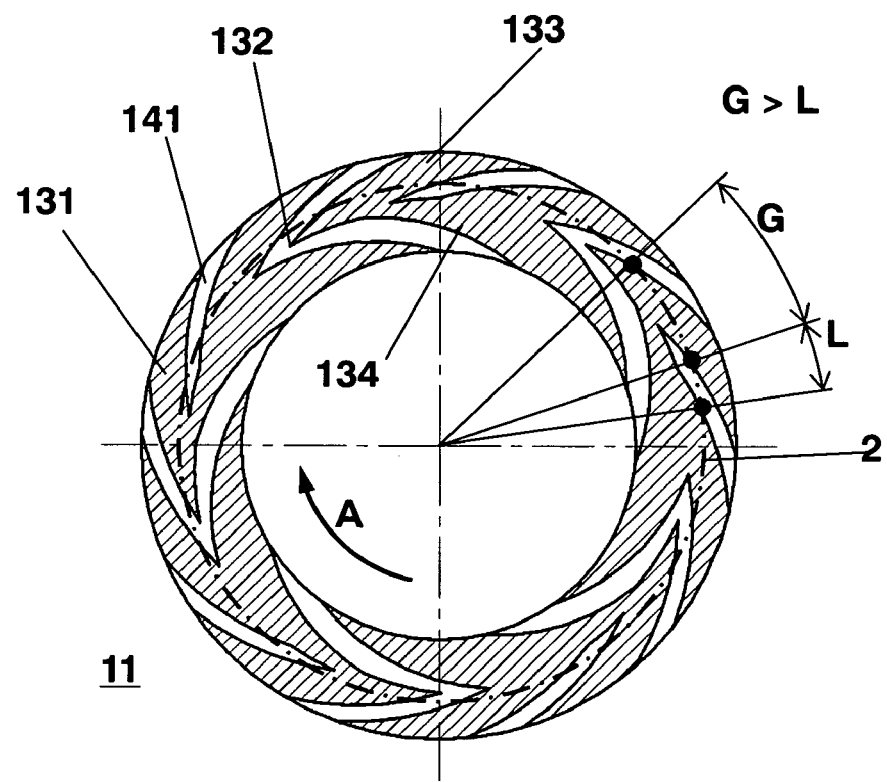
FIG. 7B is another pattern diagram of herringbone grooves on the bearing surface of the thrust dynamic pressure bearing according to the first exemplary embodiment of the present invention.

FIG. 7A illustrates a case where the number of grooves is the same at the inner and outer circumferences from intermediate bend 132. However, as shown in FIG. 7B, the number of grooves at the outer side may be greater than that at the inner. In FIG. 7B, G:L changes locally at the inner side near the intermediate bend. This prevents the circumferential length of a land at the most inner circumference from becoming too small even if G:L is constant at most parts radially, for example. Consequently, bearing stress during metal contact at startup can be reduced. Here, the number of grooves at the outer circumference is 10, and that at the inner is 5, but not limited to these values.

SECOND EXEMPLARY EMBODIMENT

Figure 8A:
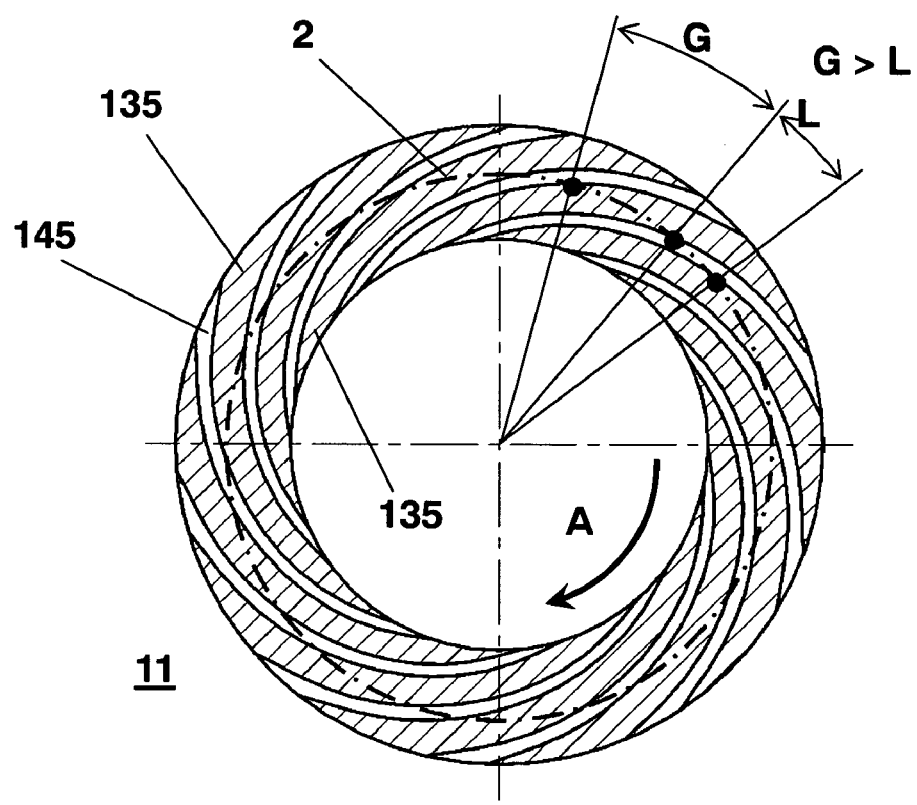
FIG. 8A is a pattern diagram of spiral grooves on the bearing surface of a thrust dynamic pressure bearing according to the second exemplary embodiment of the present invention.

FIG. 8A illustrates a thrust dynamic pressure bearing according to the second exemplary embodiment of the present invention.

Figure 12A:
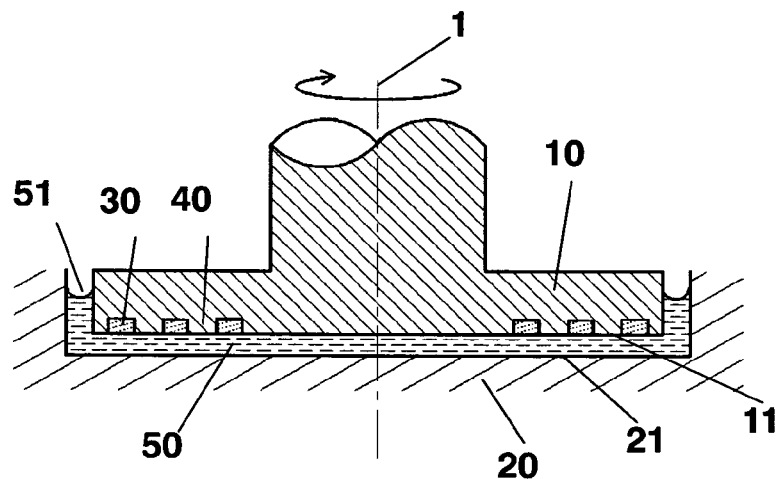
FIG. 12A is a block diagram of a conventional thrust dynamic pressure bearing.
Figure 12B:
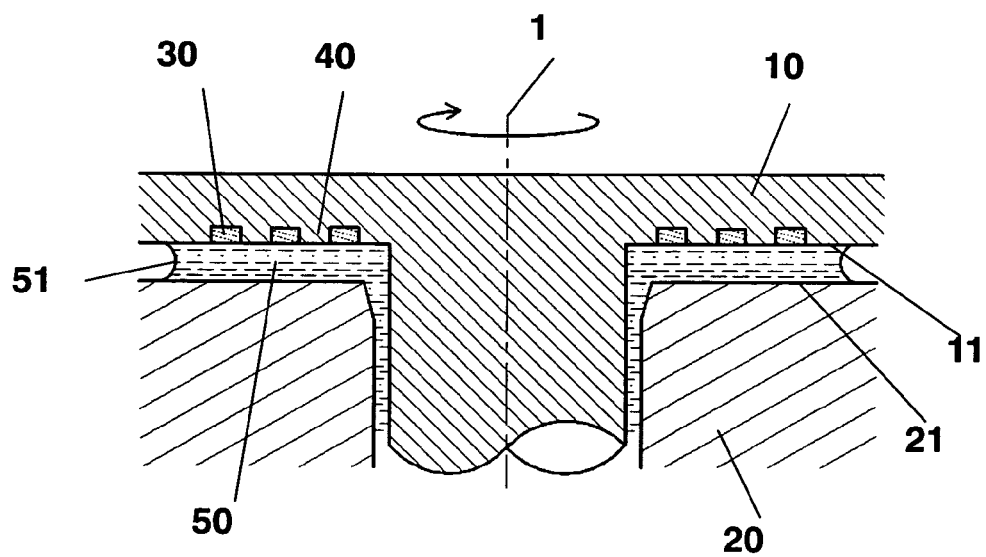
FIG. 12B is a block diagram of the conventional thrust dynamic pressure bearing.
Figure 13:
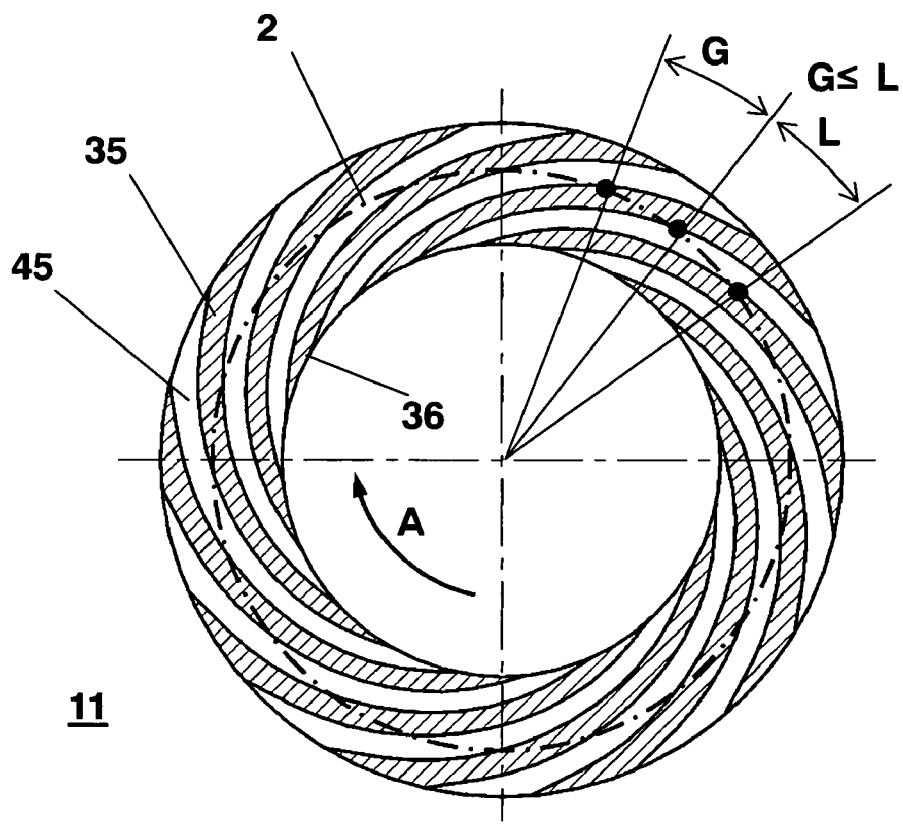
FIG. 13 is a pattern diagram of spiral grooves on the bearing surface of the conventional thrust dynamic pressure bearing.
Figure 14:
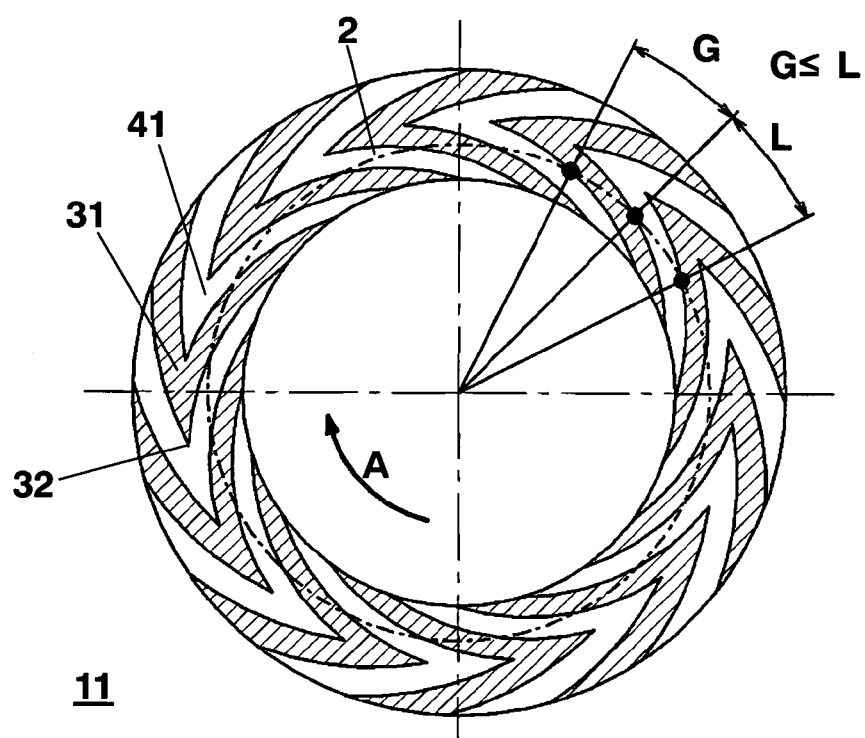
FIG. 14 is a pattern diagram of herringbone grooves on the bearing surface of the conventional thrust dynamic pressure bearing.
Figure 15A:
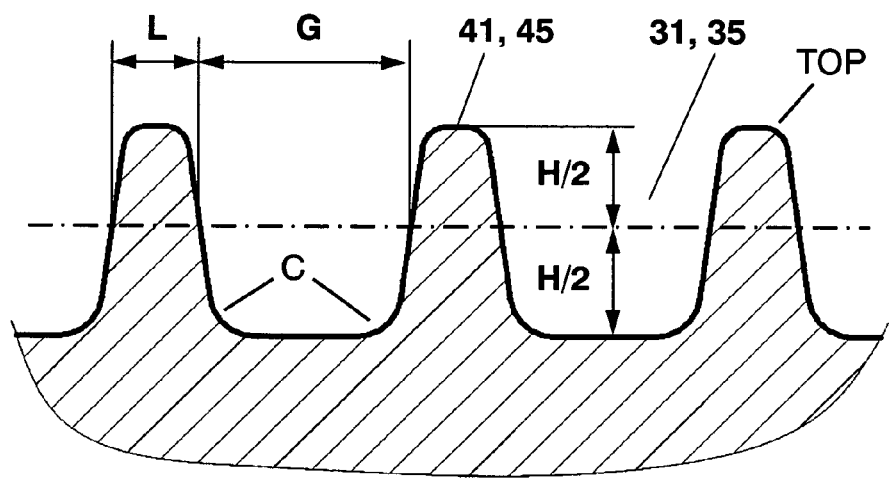
FIG. 15A is a cross-sectional view of dynamic pressure generating grooves along circle 2 with an arbitrary radius, on the bearing surface of the conventional thrust dynamic pressure bearing.
Figure 15B:
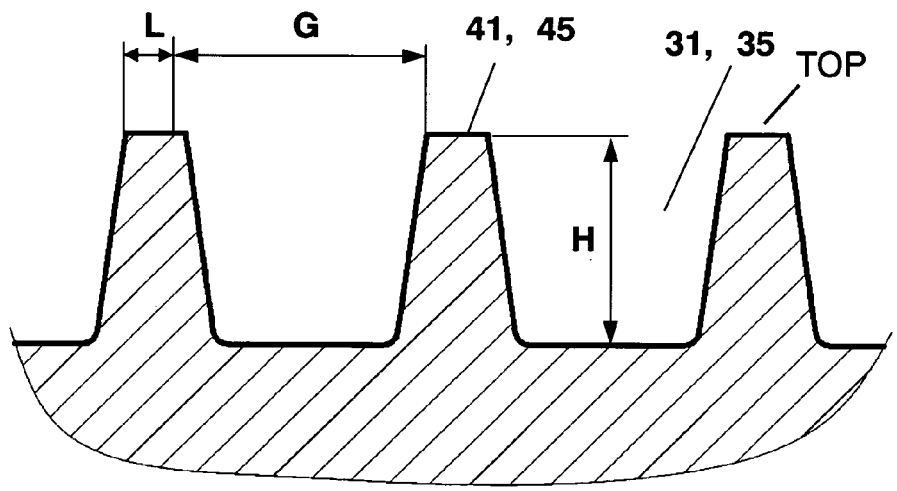
FIG. 15B is a cross-sectional view of another example for the dynamic pressure generating grooves along circle 2 with an arbitrary radius, on the bearing surface of the conventional thrust dynamic pressure bearing.
Figure 16A:
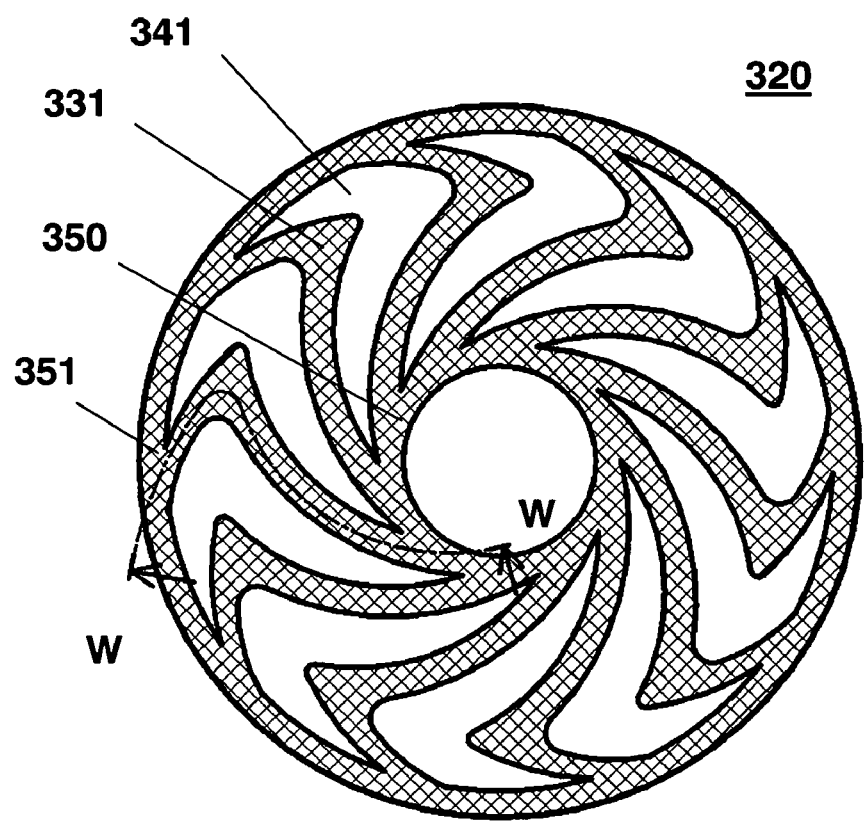
FIG. 16A is a pattern diagram of herringbone grooves on the bearing surface of the conventional thrust dynamic pressure bearing.
Figure 16B:
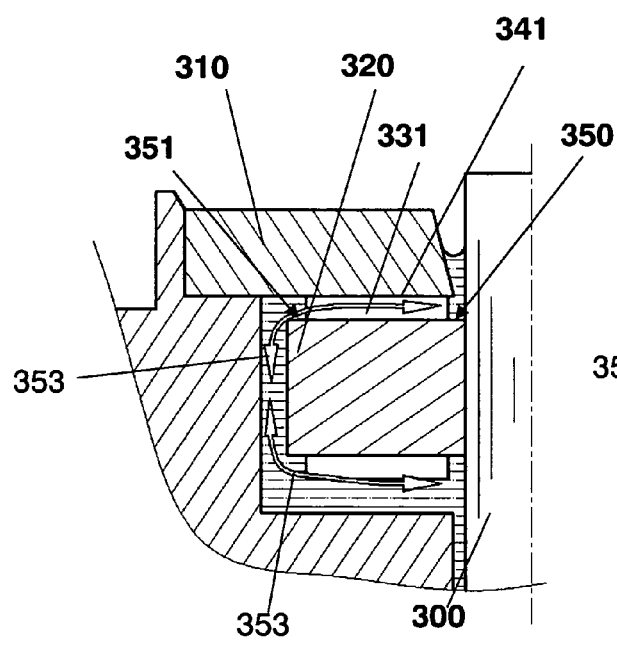
FIG. 16B is a sectional view of the substantial bearing part of the thrust bearing in a state of the motor stopped.
Figure 16C:
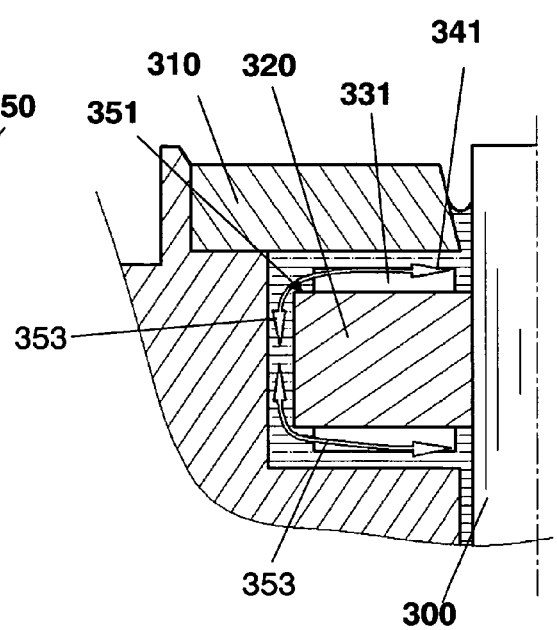
FIG. 16C is a sectional view of the substantial bearing part of the thrust bearing in a state of the motor rotating.

The second embodiment is different from the conventional example in that groove width G of spiral groove 135 formed on rotating-side bearing surface 11 and width L of a land adjacent to the dynamic pressure generating groove hold G>L. The other fundamental makeup is the same as in FIGS. 12, 14, showing the conventional example.

In other words, the bearing is composed of bearing surface 11 of the axis of rotating-side member (rotor) 10 , and bearing surface 21 of fixed-side member 20, where both surfaces mutually face in the direction of rotation center axis 1, having a minute interspace filled with lubricating oil 50 therebetween. The outer circumference of the minute interspace is provided thereon with a sealing section forming air-liquid boundary surface 51 for lubricating oil 50 and air. As shown in FIG. 8A, multiple spiral grooves 135 for generating dynamic pressure, and lands 145 with the same shape as the dynamic pressure generating grooves are formed on bearing surface 11 of rotating-side bearing member 10, alternately at a given pitch, and additionally so that groove width G and land width L satisfy G>L. At this moment, radial change in ratio G:L of groove width G and land width L is allowed as long as G>L is satisfied at an arbitrary position in radial direction 2.

Here, ratio G:L of groove width G of spiral groove 135 to width L of a land adjacent to spiral groove 135 is to range from G:L=65:35 to G:L=80:20. Even if ratio G:L changes radially, it is to range from G:L=65:35 to G:L=80:20.

Meanwhile, FIGS. 4, 5, 6, show results of the numeric analysis using finite element method on a thrust dynamic pressure bearing with spiral grooves. The figures show ratio G:L of groove width G to land width L, inclination-resistant rigidity of the thrust dynamic pressure bearing, and the relationship between bearing loss torque and floating level of the thrust bearing, in a case of a constant thrust load. Here, the vertical axis indicates ratios assuming that each value is 1.0 when G:L=50:50.

In a thrust dynamic pressure bearing in such makeup, lubricating oil flows along spiral groove 135 toward most inner circumference 136 when bearing surface 11 rotates in direction A. At this moment, dynamic pressure occurs in a region centering on most inner circumference 136. This dynamic pressure lifts bearing rotating member 10 axiswise against the thrust load, to retain the rotation out of touch. From the same reason described using FIGS. 1 through 3 before, inclination-resistant rigidity higher and loss torque lower than those in the conventional thrust dynamic pressure bearing are achieved.

In the above description, spiral groove 135 is formed on bearing surface 11 of rotating-side bearing member (rotor) 10, and bearing surface 21 of fixed-side bearing member 20 is to be a smooth surface. However, the present invention is not limited to this makeup, but spiral groove 135 may be formed on bearing surface 21 of fixed-side bearing member 20, and bearing surface 11 of rotating-side bearing member 10 may be a smooth surface.

In the above description, ratio G:L ranges from G:L=65:35 to G:L =80:20, and more desirably it could be from G:L=65: 35 to G:L=75:25.

Ratio G:L does not need to be fixed to one value on the bearing surface, but different kinds of combination may be arranged regularly. Such an example may be the following. That is, two kinds of groove widths G, G', and two kinds of land width L, L' hold G>L, G>L', G'>L, and G'>L', Then, two kinds of grooves and lands are arranged.

Further, ratios G:L and G':L' of groove width to land width range from 65:35 to 80:20, and more desirably 65:35 to 75:25. Then, these respective two kinds of grooves and lands are alternately arranged.

The present invention does not need to hold G>L over the entire region of the dynamic pressure generating grooves. The present invention could hold G>L in an area of 70%, desirably 80%, and more desirably 90%, or more of the area where the dynamic pressure generating grooves are formed. For example, in any one of the rotating-side bearing member and the fixed-side bearing member, when warpage occurs under the influence of processing accuracy or the like, contact is made only at the inner circumference when stopped, and an interspace is generated at the outer circumference, the thrust bearing increases its number of rotations while contact sliding at its inner circumference at startup, to lift eventually. At this moment, small land width L of the inner circumference may cause wear and/or burn due to high bearing stress during metal contact. Therefore, land width L of the inner circumference could be increased to suppress bearing stress of the metal contact part at startup. For this purpose, G and L may be G:L=80:20, more desirably G:L=75:25, from the outer circumference to the central part radially. G and L may be G≦L near the inner circumference. Inversely, G and L may be G:L=65:35 from the inner circumference to the central part radially. Even if G and L hold G≦L locally only at the most inner circumference, the purpose of the present invention can be achieved.

Figure 8B:
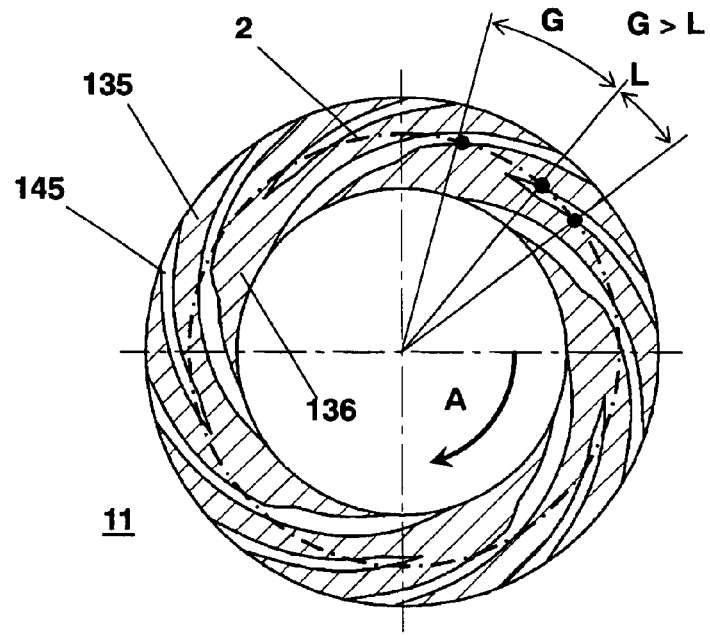
FIG. 8B is another pattern diagram of spiral grooves on the bearing surface of the thrust dynamic pressure bearing according to the second exemplary embodiment of the present invention.

FIG. 8A illustrates a case where the number of grooves is the same at the inner and outer circumferences. However, as shown in FIG. 8B, the number of grooves at the outer side may be greater than that at the inner. In this figure, G:L changes locally at the radially central part. This prevents the circumferential length of a land at the most inner circumference from becoming too small even if G:L is constant at most parts radially, for example. Consequently, bearing stress during metal contact at startup can be reduced.

THIRD EXEMPLARY EMBODIMENT

Figure 9:
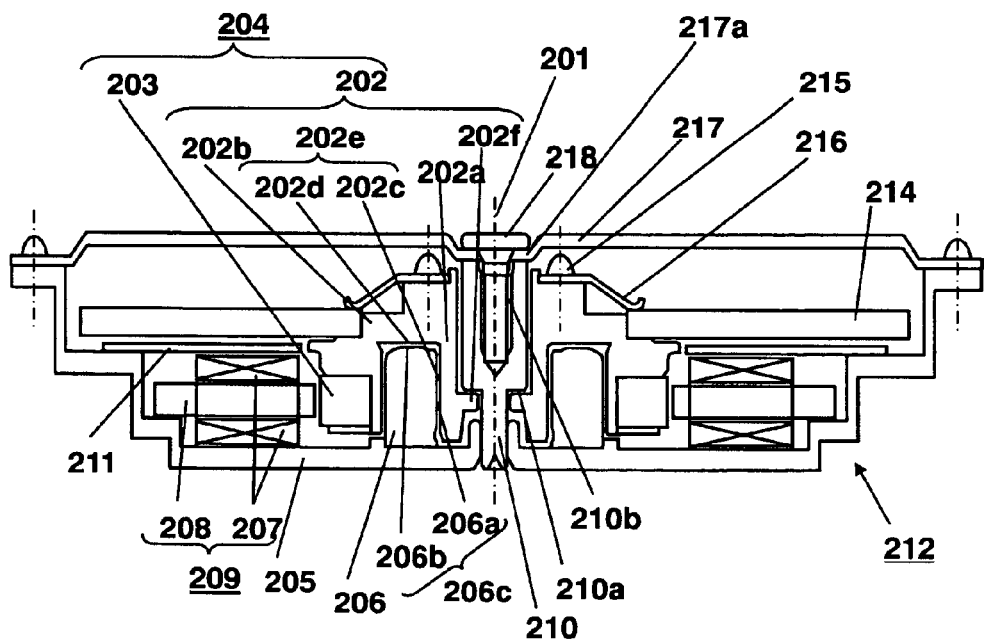
FIG. 9 is an outline sectional view of a spindle motor and disk drive according to the third exemplary embodiment of the present invention.
Figure 10:
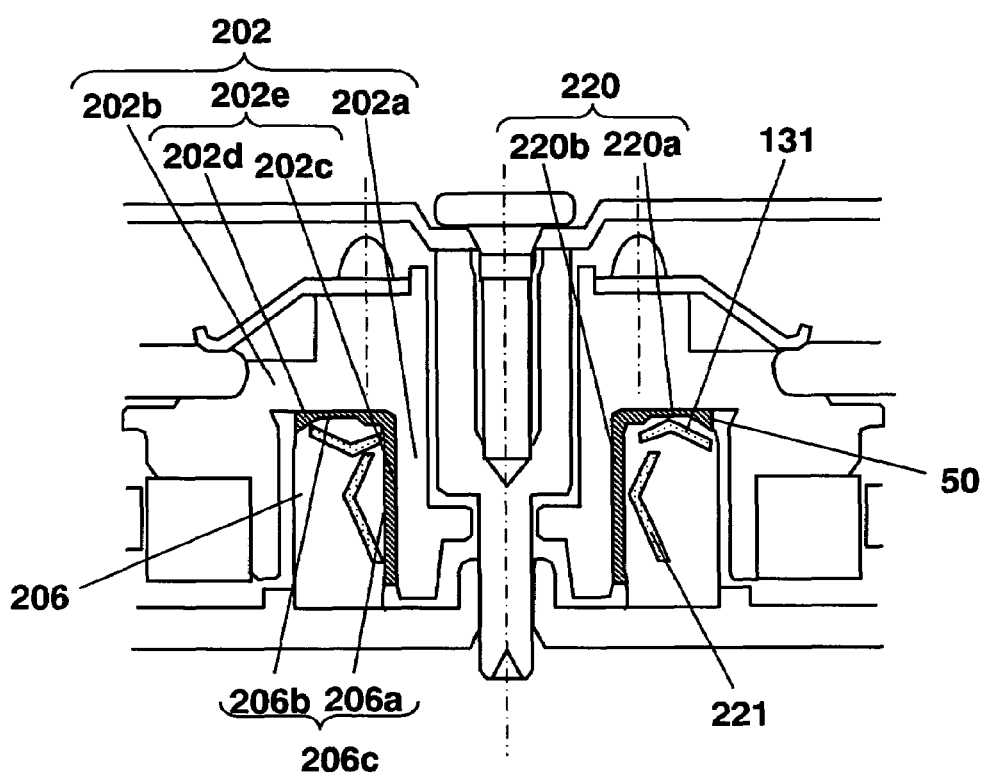
FIG. 10 is an enlarged sectional view of the dynamic pressure bearing of a spindle motor according to the third exemplary embodiment of the present invention.
Figure 11:
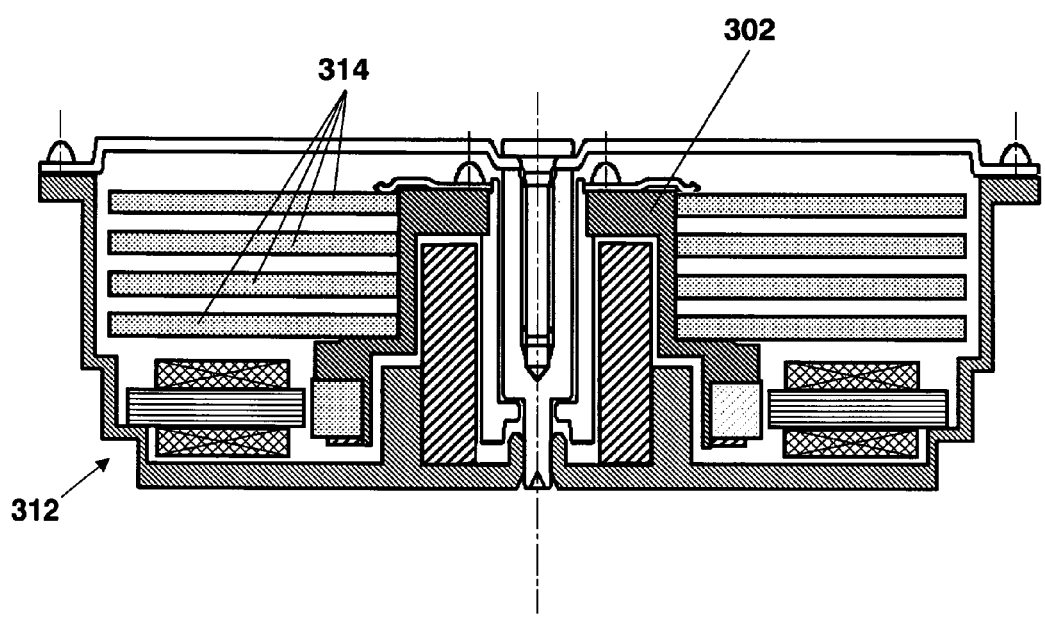
FIG. 11 is an outline sectional view of another example for the spindle motor and disk drive according to the third exemplary embodiment of the present invention.

FIGS. 9 through 11 illustrate a spindle motor and an information recording/reproducing device according to the third exemplary embodiment of the present invention.

FIG. 9 is an outline sectional view of the substantial part along a plane including the axis center of rotation center 201 for illustrating the spindle motor and the information recording/reproducing device according to the third embodiment of the present invention. Here, the illustrated information recording/reproducing device shows an example of a disk drive such as a hard disk drive or optical disc drive adopting a dynamic pressure thrust bearing and a spindle motor according to the present invention.

In FIG. 9, rotor 202 rotating around rotation center 201 has hollow cylinder 202a and flange 202b near rotation center 201. Rotating-side bearing 202e of the dynamic pressure bearing is formed on outer circumferential surface 202c of hollow cylinder 202a and bottom end surface 202d of flange 202b.

Rotating magnet 203 magnetized to multiple magnetic poles is fastened to the bottom surface at the outer circumference of flange 202b of rotor 202 with a method such as press-fit or bonding, to compose rotor 204 made of rotor 202 and rotating magnet 203.

The inner circumferential surface of hollow cylinder 202a of rotor 202 composing rotor 204 has its large internal diameter at flange 202b of rotor 202. Additionally, it has at least two different internal diameters so as to become small at chassis 205 side. Multilevel surface 202f for connecting the inner circumferential surfaces at flange 202b and chassis 205 sides is formed so as to be substantially perpendicular to the direction of the axis of rotation center 201.

Meanwhile, fixed-side bearing member 206 is fastened to chassis 205 with a widely known method such as press-fit, bonding, or welding, corresponding to rotating-side bearing 202e of rotor 202. On inner circumferential surface 206a and top end surface 206b of fixed-side bearing member 206, fixed-side bearing 206c of the dynamic pressure bearing is formed. Stator 209 is fastened to chassis 205 so that the inner circumferential surface of the distal end of multiple magnetic pole teeth on stator 209, composed of coil 207 around which multiple magnetic pole teeth on stator core 208 are coiled, faces the outer circumferential surface of rotating magnet 203 fastened to rotor 202.

Fixed axis 210 is fastened to chassis 205 with a method such as press-fit or bonding so that the axis center is substantially conformed to rotation center 201, and fixed axis 210 passes through the hollow part of hollow cylinder 202a of rotor 202, with an interspace allowed.

Shielding plate 211 for magnetically shielding magnetic flux leaking from stator 209 is fastened to chassis 205 to form spindle motor 212.

Fixed axis 210 has a small external diameter of its outer circumferential surface at chassis 205 side. At the side opposite to chassis 205, fixed axis 210 has a stepped axis shape with a large external diameter of its outer circumferential surface, where the external diameter at chassis 205 side is smaller than the internal diameter at chassis 205 side of the inner circumferential surface of cylinder 202a of rotor 202. Fixed axis 210 is formed so that the external diameter at the side opposite to chassis 205 is smaller than the internal diameter of the inner circumferential surface at flange 202b side of rotor 202. Stepped surface 210a connecting the outer circumferential surface at chassis 205 side, with smaller external diameter, to the outer circumferential surface at the side opposite to chassis 205, with larger external diameter, has a shape substantially perpendicular to the direction of the axis of rotation center 201.

Then, multilevel surface 202f connecting the inner circumferential surface at flange 202b side of hollow cylinder 202a of rotor 202, to the inner circumferential surface at chassis 205 side; and stepped surface 210a of fixed axis 210, are fixed to chassis 205, so as to mutually face with an extremely small, given interspace.

Internal screw 210b is formed at the central portion of the end of fixed axis 210 at the side opposite to chassis 205.

Disk 214, on the surface of which recording medium (not illustrated) is formed, is placed on the top surface of flange 202b of rotor 202; disk 214 is press fixed to the top surface of flange 202b of rotor 202 by means of elastic force of disk holding member 216 fixed with screw 215; and disk 214 is structured rotatably according to rotation of rotor 202.

A signal conversion element (not illustrated) is disposed facing disk 214 through swinging means (not illustrated) for positioning the signal conversion element for recording and reproducing on a recording medium formed on disk 214 by means of a widely known method, to a given track position.

A recording medium formed on disk 214 may be formed on both top and bottom sides of disk 214. In such makeup, the signal conversion element and swinging means are to correspond to respective recording media formed on the top and bottom surfaces of disk 214.

Further, a through-hole is provided on cover 217 at a position corresponding to internal screw 210b of fixed axis 210. The bottom end surface of touching part 217a of cover 217 is touched by the top end surface of fixed axis 210, and cover fixing screw 218 is screw cramped to internal screw 210b of fixed axis 210 through a through-hole on cover 217, to fix cover 217 to fixed axis 210. Meanwhile, cover 217 is fixedly retained to chassis 205, a cabinet (not illustrated), or the like, at the periphery of cover 217, by cramping with screws. A disk drive is composed of components such as disk 214, a signal conversion element, swinging means, spindle motor 212, and cover 217. Here, cover 217 and fixed axis 210 do not necessarily need to be screw cramped.

Next, a detailed description is made for the makeup of the dynamic pressure bearing.

FIG. 10 is an expanded outline sectional view of dynamic pressure bearing 220 and its surrounding components, of a spindle motor.

In FIG. 10, radial dynamic pressure bearing 220b is composed between outer circumferential surface 202c of hollow cylinder 202a of rotor 202; and inner circumferential surface 206a of fixed-side bearing member 206, facing the outer circumferential surface, with lubricating oil 50 such as esters synthetic oil filled between the surfaces facing rotating-side bearing 202e of rotor 202 and fixed-side bearing 206c, respectively. Thrust dynamic pressure bearing 220a is composed between bottom end surface 202d of flange 202b of rotor 202 and top end surface 206b of fixed-side bearing member 206 facing it.

In FIG. 10, for radial dynamic pressure bearing 220b, herringbone grooves 221 are formed on inner circumferential surface 206a of fixed-side bearing member 206, namely fixed-side bearing 206c, as dynamic pressure generating grooves. Outer circumferential surface 202c of hollow cylinder 202a of rotor 202, namely rotating-side bearing 202e facing bearing member 206, is a smooth surface.

For thrust dynamic pressure bearing 220a, multiple herringbone grooves 131 having intermediate bends 132 for generating dynamic pressure and lands (not illustrated) with the same shape as dynamic pressure generating grooves are formed on top end surface 206b of fixed-side bearing member 206, namely fixed-side bearing 206c, alternately at a given pitch, and further so that groove width G and land width L hold G>L. Here, the relationship between groove width G of herringbone groove 131 and width L of a land adjacent to herringbone groove 131 ranges from G:L=65:35 to G:L=75:25.

Bottom end surface 202d of flange 202b of rotor 202, which is rotating-side bearing 202e facing top end surface 206b of fixed-side bearing member 206, which is fixed-side bearing 206c with dynamic pressure generating grooves formed thereon is a smooth surface.

In dynamic pressure bearing 220 of spindle motor 212 thus composed, dynamic pressure is induced by means of the dynamic pressure generating grooves when rotating-side bearing 202e of rotor 202 rotates, to retain the rotation of rotor 202 out of touch. At this moment, thrust dynamic pressure bearing 220a can achieve inclination-resistant rigidity larger than that in a conventional thrust dynamic pressure bearing, for the reason described before using FIG. 1 through 3. Accordingly, rotor 202 rotates with high rotation accuracy owing to axial runout suppressed. Further, the bearing loss torque lower than that in a conventional thrust dynamic pressure bearing reduces power consumption of spindle motor 212. In addition, the large inclination-resistant rigidity of thrust dynamic pressure bearing 220a enables reducing the axiswise length of radial dynamic pressure bearing 220b, thus facilitating slimming down of spindle motor 212, and additionally of an information recording/reproducing device such as a disk drive.

As a result of the relationship between groove width G of dynamic pressure generating grooves of thrust dynamic pressure bearing 220a and width L of a land adjacent to the dynamic pressure generating groove being G<L, a slim spindle motor with high rotation accuracy and low power consumption can be implemented. Additionally, an information recording/reproducing device can be implemented such as a slim disk drive with high reliability and low power consumption, suitable for a personal digital assistance.

In the above description for radial dynamic pressure bearing 220b, herringbone grooves 221 are formed on inner circumferential surface 206a of fixed-side bearing member 206, namely fixed-side bearing 206c, as dynamic pressure generating grooves. Outer circumferential surface 202c of hollow cylinder 202a of rotor 202, namely rotating-side bearing 202e, is to be a smooth surface. However, the present invention is not limited to this makeup, but inner circumferential surface 206a of fixed-side bearing member 206, namely fixed-side bearing 206c, may be a smooth surface, and herringbone grooves 221, namely dynamic pressure generating groove, may be formed on outer circumferential surface 202c of hollow cylinder 202a of rotor 202, namely rotating-side bearing 202e.

In the above description for thrust dynamic pressure bearing 220a, herringbone grooves 131, namely dynamic pressure generating grooves, are formed on top end surface 206b of fixed-side bearing member 206, namely fixed-side bearing 206c; and bottom end surface 202d of flange 202b of rotor 202, namely rotating-side bearing 202e, is to be a smooth surface. However, the present invention is not limited to this makeup, but top end surface 206b of fixed-side bearing member 206, namely fixed-side bearing 206c, may be a smooth surface, and herringbone grooves 131, namely dynamic pressure generating grooves, may be formed on bottom end surface 202d of flange 202b of rotor 202, namely, rotating-side bearing 202e.

In the above description for herringbone groove 131, the relationship between groove width G of the dynamic pressure generating groove of thrust dynamic pressure bearing 220a and width L of a land adjacent to the dynamic pressure generating groove is G>L. However, the present invention is not limited to this makeup, but spiral grooves satisfying G>L may be used.

In the third exemplary embodiment, the description is made for a spindle motor and disk drive that are loaded with one disk. However, as shown in FIG. 11, spindle motor 312 may be formed so that rotors 302 can be loaded with multiple disks 314 to compose a disk drive loaded with multiple disks 314 by means of a well-known method.

Moreover, the present invention is not limited to a motor for a disk drive, or the like, but applies to a rotating head motor for a VCR; a motor for driving a polygon mirror used for a laser beam printer, image scanner, copy machine, or other devices; and an information recording/reproducing device loaded with these motors, for example.

In FIGS. 9, 10, 11, the exemplification is made for the makeup in which the thrust bearing is disposed between the top surface of the fixed-side bearing member, substantially cylinder-shaped, and the bottom surface of the rotor. However, the present invention is not limited to this makeup, but a rotating sleeve may be arranged facing a ring-shaped thrust flange fixed to the fixed axis, for example. The present invention may have any makeup as long as it is not susceptible to the entire makeup of the bearing, such as the following example. That is, a rotation axis with its bottom end planarized is inserted into a pouched fixed-side bearing member with its one end blocked by a thrust plate, to compose a thrust bearing between the thrust plate and the bottom end of the rotation axis.

INDUSTRIAL APPLICABILITY

A thrust dynamic pressure bearing according to the present invention has superior features of high inclination-resistant rigidity, high rotation accuracy, and low bearing loss torque, and is useful as a thrust dynamic pressure bearing for a slim spindle motor for rotating a recording medium in a small, slim information recording/reproducing device mounted on a personal digital assistance, thus having high industrial applicability.

The invention claimed is:

1. A thrust dynamic pressure bearing comprising:
   a bearing surface of a rotating-side bearing member; and
   a bearing surface of a fixed-side bearing member, both surfaces facing each other axiswise through a minute interspace, wherein
   the minute interspace is filled with lubricating oil;
   a plurality of dynamic pressure generating grooves are formed on at least one of the bearing surfaces of the rotating-side bearing member and the fixed-side bearing member;
   rotation is retained by dynamic pressure of lubricating oil being induced by means of the dynamic pressure generating grooves according to rotation of the rotating-side bearing member; and
   groove width G in a circumferential direction of rotation of the rotating-side bearing member, of the dynamic pressure generating groove; and width L in a circumferential direction of rotation of the rotating-side bearing member, of a land circumferentially adjacent to the dynamic pressure generating groove hold G>L in an area of 80% or more of the area in which the dynamic pressure generating grooves provided on the bearing surface are formed.

2. The thrust dynamic pressure bearing as claimed in claim 1, wherein the dynamic pressure generating groove has a herringbone shape.

3. The thrust dynamic pressure bearing as claimed in claim 2, wherein relationship between groove width G of the dynamic pressure generating groove and width L of a land circumferentially adjacent to the dynamic pressure generating groove ranges from G:L=65:35 to G:L=75:25.

4. The thrust dynamic pressure bearing as claimed in claim 1, wherein the dynamic pressure generating groove has a spiral shape.

5. The thrust dynamic pressure bearing as claimed in claim 4, wherein relationship between groove width G of the dynamic pressure generating groove and width L of a land circumferentially adjacent to the dynamic pressure generating groove ranges from G:L=65:35 to G:L=80:20.

6. A thrust dynamic pressure bearing comprising:
   a bearing surface of a rotating-side bearing member; and
   a bearing surface of a fixed-side bearing member, both surfaces facing each other axiswise through a minute interspace, wherein
   the minute interspace is filled with lubricating oil;
   a plurality of dynamic pressure generating grooves having a herringbone shape are formed on at least one of the bearing surfaces of the rotating-side bearing member and the fixed-side bearing member;
   rotation is retained by dynamic pressure of lubricating oil being induced by means of the dynamic pressure generating grooves according to rotation of the rotating-side bearing member; and
   relationship between groove width G in a circumferential direction of rotation of the rotating-side bearing member, of the dynamic pressure generating grooves; and width L in a circumferential direction of rotation of the rotating-side bearing member, of a land circumferentially adjacent to the dynamic pressure generating groove ranges from G:L=65:35 to G:L=75:25.

7. A thrust dynamic pressure bearing comprising:
   a bearing surface of a rotating-side bearing member; and
   a bearing surface of a fixed-side bearing member, both surfaces facing each other axiswise through a minute interspace, wherein
   the minute interspace is filled with lubricating oil;
   a plurality of dynamic pressure generating grooves having a spiral shape are formed on at least one of the bearing surfaces of the rotating-side bearing member and the fixed-side bearing member;
   rotation is retained by dynamic pressure of lubricating oil being induced by means of the dynamic pressure generating groove according to rotation of the rotating-side bearing member; and
   relationship between groove width G in a circumferential direction of rotation of the rotating-side bearing member, of the dynamic pressure generating groove and width L in a circumferential direction of rotation of the rotating-side bearing member, of a land circumferentially adjacent to the dynamic pressure generating groove ranges from G:L=65:35 to G:L=80:20.

8. A spindle motor comprising a thrust dynamic pressure bearing as claimed in any one of claims 1 through 7.

9. An information recording and reproducing device comprising a spindle motor having a thrust dynamic pressure bearing as claimed in any one of claims 1 through 7.

* * * * *